J. G. McINTOSH.
MACHINERY EFFICIENCY RECORDER.
APPLICATION FILED DEC. 15, 1911.

1,066,744.

Patented July 8, 1913.
3 SHEETS—SHEET 1.

WITNESSES:
B. P. Burgess
J. B. Hodgdon

INVENTOR.
John G. McIntosh
BY C. D. Haskins
ATTORNEY.

J. G. McINTOSH.
MACHINERY EFFICIENCY RECORDER.
APPLICATION FILED DEC. 16, 1911.

1,066,744.

Patented July 8, 1913.

3 SHEETS—SHEET 2.

WITNESSES:

INVENTOR.
John G. McIntosh
BY
C. D. Haskins
ATTORNEY

J. G. McINTOSH.
MACHINERY EFFICIENCY RECORDER.
APPLICATION FILED DEC. 16, 1911.
1,066,744.
Patented July 8, 1913.
3 SHEETS—SHEET 3.
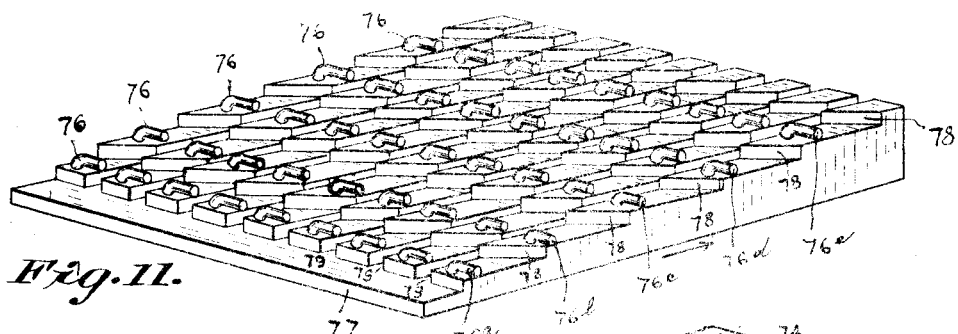
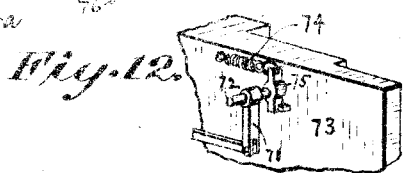
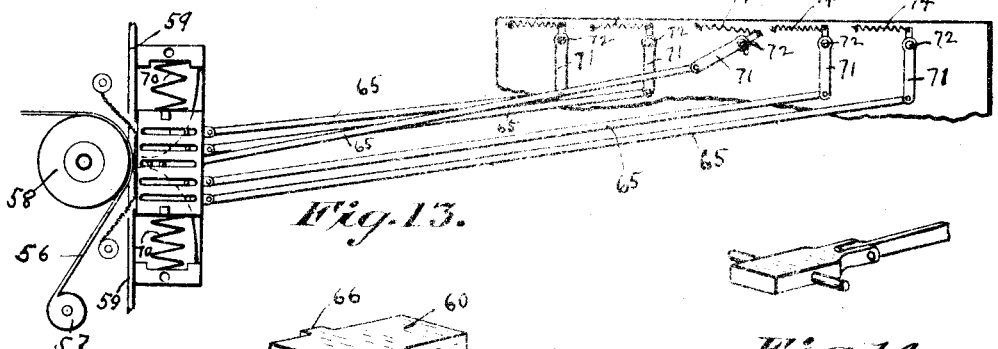
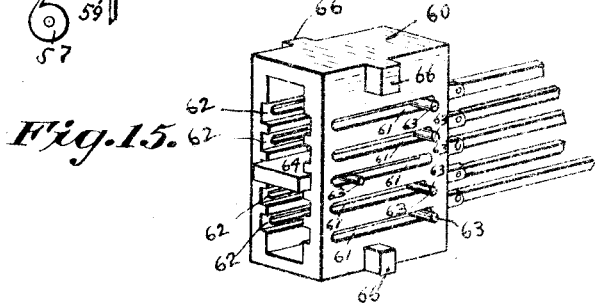
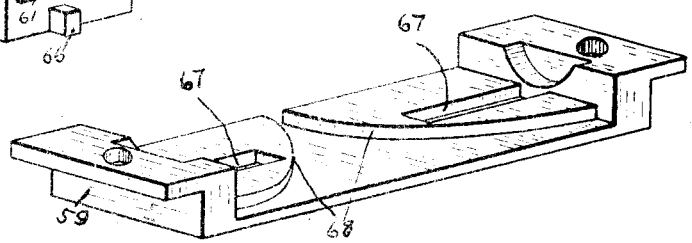
WITNESSES:
B. P. Burgess
J. B. Hodgdon
INVENTOR.
John G. McIntosh
BY
C. D. Haskins
ATTORNEY.

UNITED STATES PATENT OFFICE.

JOHN G. McINTOSH, OF SEATTLE, WASHINGTON.

MACHINERY-EFFICIENCY RECORDER.

1,066,744.  Specification of Letters Patent.  Patented July 8, 1913.

Application filed December 16, 1911. Serial No. 666,306.

*To all whom it may concern:*

Be it known that I, JOHN G. MCINTOSH, citizen of the United States, residing at Seattle, in the county of King and State of Washington, have invented a certain new and useful Improvement in Machinery-Efficiency Recorders, of which the following is a specification.

My invention relates to automatic means for graphically recording the rate of progress and the results of the operations that may be effected by machinery employed in sawing logs into the form of lumber of all the various kinds and for recording the number and a description of the logs operated upon; and the object of my invention is to provide automatic means whereby in the operation of a saw mill the degree of efficiency of the machinery for any period of time may be determined accurately and whereby may be recorded automatically a description of the product of each machine with respect to its form, quality and quantity, and further, whereby may be recorded automatically the particular hour and minute of the day at which any particular operation is effected. I attain such object by devices illustrated in the accompanying drawings wherein—

Figure 1:
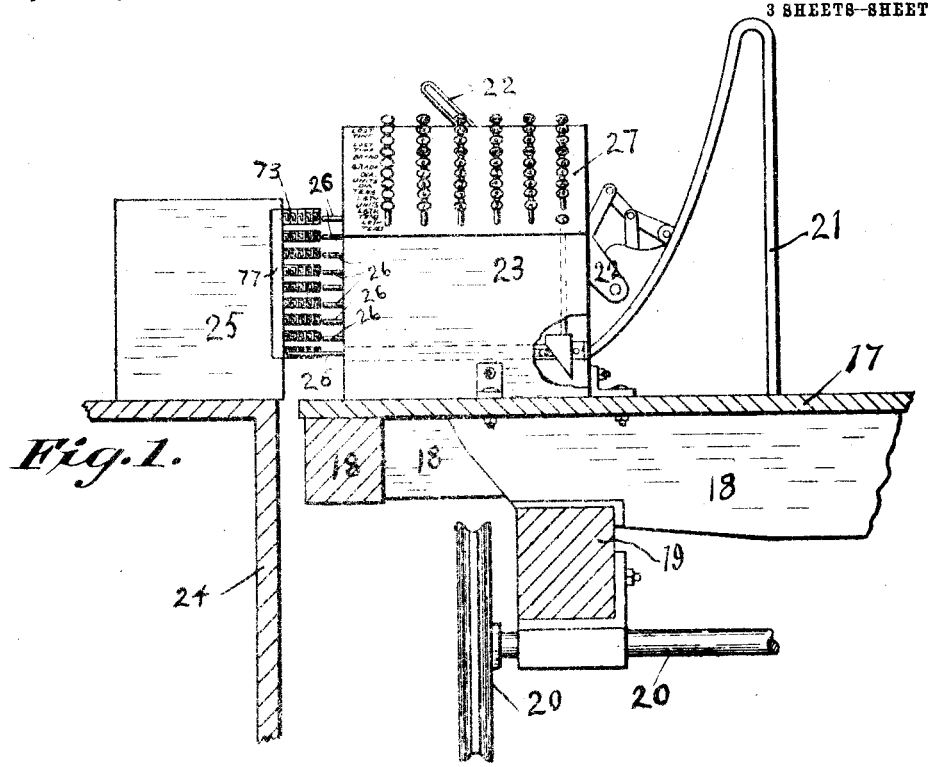
Figure 2:
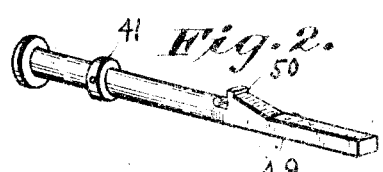
Figure 3:
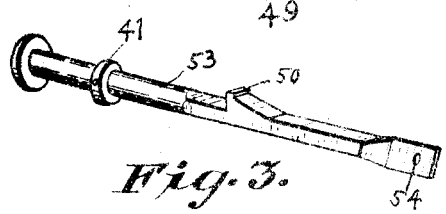
Figure 6:
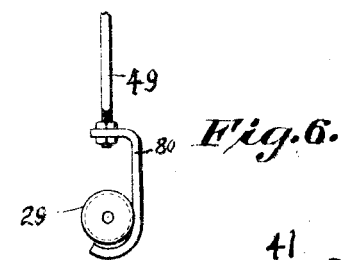
Figure 4:
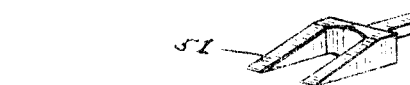
Figure 4:
Figure 5:
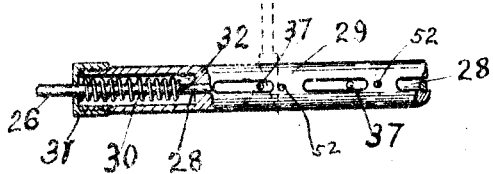
Figure 7:
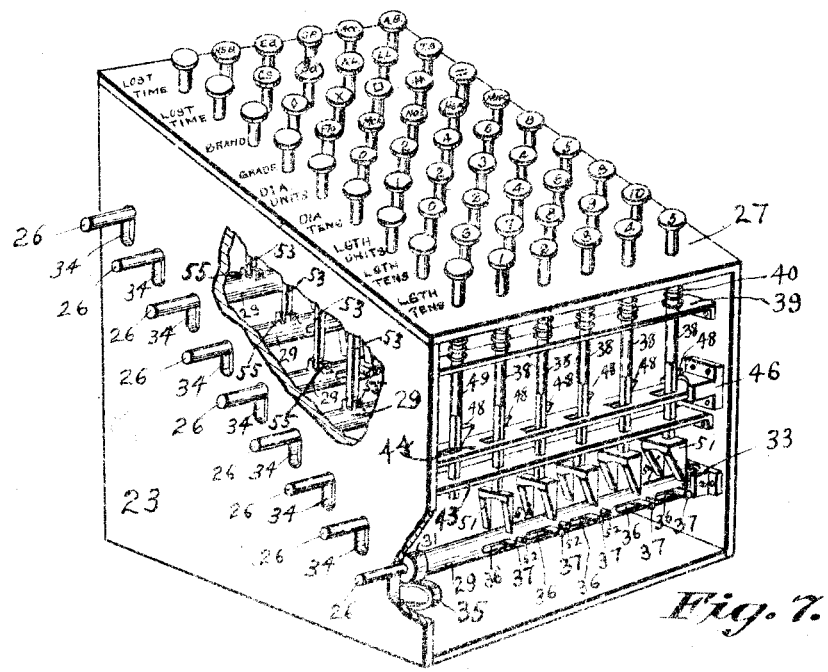
Figure 8:
Figure 9:
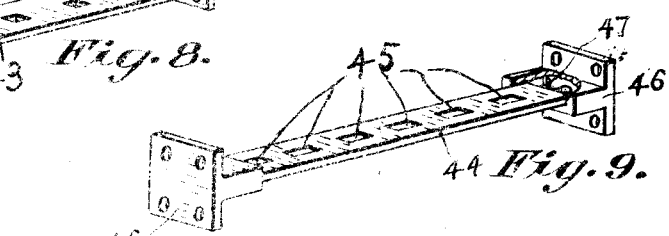
Figure 10:
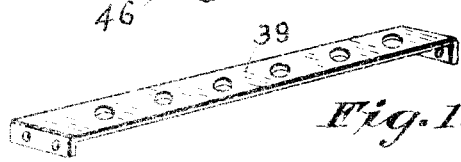

Figure 1 is a view in front elevation of essential parts of my invention, as they are disposed on mill machinery which is indicated partly in cross-section, Figs. 2–3 and 4 are each a perspective view of a detail of my invention, Fig. 5 is a fragmentary view of a part of my invention, partly in side elevation and partly in longitudinal-section, Fig. 6 shows a modified form of a part of my invention, Fig. 7 is a view in perspective showing different parts of my invention and their respective dispositions, Figs. 8–9 and 10 show, each by perspective view a form of the guide strips employed in my invention for guiding and governing the key-rods shown in Figs. 2–3 and 4, Fig. 11 is a perspective view of parts of my invention, Fig. 12 is a view in perspective of a fragment of same, Fig. 13 is a view in rear elevation showing the position of several parts of my invention, Figs. 14 and 15 are perspective views of fragments of my invention and Fig. 16 shows in perspective a detail thereof.

In the operation of a saw-mill with a given crew of men the production of lumber of a given kind may differ greatly in amount from day to day. The efficiency of the men and machinery may be of the highest some days though the out-put of product may be small owing to adverse conditions, while on other days conditions may cause a large production, comparatively, though the machinery may not be operated to its full capacity by reason of neglect and inattention of workmen.

By my invention any inefficiency of machinery or workmen may be detected, the causes of trouble and undue delays located, the quality, class, dimensions and quantity of product recorded and the amount of time consumed in effecting any given operation be determined; thus the manager of a sawmill may have a knowledge of conditions that will enable him to acquire and maintain a high degree of efficiency in workmen and machinery.

Briefly my invention comprises automatic means for printing upon a strip of moving paper (that moves at a known rate of speed by motion communicated by clock-work or other mechanism) a record of the different operations that are effected in the process of sawing a log as such operations successively occur, and manual means for actuating said automatic means to print data relating to time, quantity, and quality, form and dimensions of the product of a mill.

In practical operations the printing device of my invention may be disposed upon a bench or other suitable support in proximity to the carriage of a saw-mill whereby some of its parts may engage with projecting parts of mechanism associated with the keys of a key-board when such keys are depressed, such mechanism being suitably disposed on said carriage to effect such engagement when said mechanism passes said printing device in its ride back and forth on said carriage. Such disposition of the record-printing mechanism and of the key-board mechanism of my invention is indicated in Fig. 1 of the drawings wherein 17 is the floor of a movable saw-mill carriage of well known construction which carriage is indicated by a fragmentary view in vertical cross-section of some of its parts while other of its parts are shown in side elevation, 18 indicating floor beams, 19 a supporting girder, and 20 indicates parts of the running gear. Upon the floor 17 is indicated the log-setting device 21 with one of its operating levers 22, which device 21 is shown merely to indicate its position on said carriage with relation to the position of the inclosing case 23 of the key-board mechanism whose parts will hereinafter be particularly described. Upon a stationary bench 24 adjacent to said carriage, is disposed the inclosing case 25 of a record-printing mechanism whose parts also will be specifically described hereinafter.

The function of the key-board mechanism disposed within inclosing case 23 is to act upon longitudinally movable rods whose ends 26 project through and outwardly from that side of inclosing case 23 adjacent to the mechanism disposed on the bench 24 whereby such ends 26 each independently may be caused to project outwardly farther from inclosing case 23 as may be desired to engage with projecting parts of the record-printing mechanism contained within inclosing case 25. Such outward movement of any particular rod-end 26 may be effected by a depression of one of the keys in the row of keys associated with it, there being disposed in the key-board 27 nine longitudinal rows of keys, each row containing six keys and each of which rows is associated with and adapted to control a particular rod-end 26 as most clearly indicated by Fig. 7 wherein is shown a row of six keys disposed on key-board 27 immediately over and in line with the axis of each of the rod-ends 26.

For purposes of illustration I have shown the key-board 27 as adapted for coöperating with the record-printing mechanism whereby may be recorded arbitrarily selected characters that may be interpreted to indicate the different causes of losing time in the operation of a mill, the brand-mark found on the different logs operated upon, their diameter in units and tens of inches and their lengths in units and tens of feet. Thus in Fig. 7 the first and second or upper-most two rows are appropriated to information respecting lost time, the third row from the top operates to indicate the brand-mark of a log, the fourth row may operate to indicate the grade of a log, the fifth and sixth rows may operate to indicate in inches the diameter of a log, while the seventh, eighth and ninth rows near the lower edge of the key-board 27 are adapted to operate to indicate the length of logs.

Referring to Fig. 7 the first key at the left hand of each row is shown as blank or unmarked while the five remaining keys of each row are each inscribed with a number or with letters. A depression of any one of the inscribed keys, acting through means hereinafter described, will serve to move the rod-end 26, with which it is associated, outwardly through the side of the case 23 for a predetermined distance, such distance being different for each key of a given row of keys. For instance if the key of the bottom row which is inscribed with the number 1 be depressed, the lowest rod-end 26, (disposed immediately beneath said key No. 1,) would be moved outwardly a certain distance but if number 2 key of the same row be depressed the same rod-end 26 would be forced outwardly to a certain greater distance, or if instead of key number 1 or key number 2 being depressed we should depress key number 3 then the same lowest rod-end 26 would be forced outwardly for a still greater certain distance and so on, the depression of key number 5 of the same row forcing the same lowest rod-end 26 outwardly to its greatest predetermined distance and thus it is in the case of the five inscribed keys of each row, such five keys acting in like manner to control the longitudinal movement and position of rod-end 26 with which they are associated. The blank-key at the left hand end of each row of keys when depressed acts to permit an inward movement of respective rod-end 26 whereby such rod-end 26 may return to the normal position it occupied before it was forced outwardly by one of the inscribed keys. Thus if key number 3 of the ninth and bottom row be depressed erroneously when it really be desired to depress key number 2 of the same row, then in such case the blank-key at the left hand end of such row may be depressed whereupon its rod-end 26 may move inwardly to its normal position and thereupon the really desired key number 2 may be depressed and thus correct the error.

Each of the rod-ends 26 form the end of a rod 28 as shown in Fig. 5 which rod 28 is disposed to move longitudinally and freely within a cylinder 29. The left hand end of cylinder 29 is counterbored to form a recess within which a spiral spring 30 may be disposed to surround the rod 28 such recess being closed at its outer end by a cap 31 which also serves as a guide and support to the rod 28. The spiral spring 30 is disposed on rod 28 to extend between the inner surface of the cap 31 and a pin 32 disposed in rod 28 whereby said spring 30 may act to force the rod inwardly in a direction toward the right hand as indicated in Fig. 5 in the drawing.

Referring to Fig. 7, one of the cylinders 29 is disposed in the inclosing case 23 immediately beneath each of the nine rows of keys, its right end being hinged to a suitable support 33 whereby its left hand end and the rod-end 26 associated with it is free to move vertically up and down to a distance limited by oblong holes 34 in the side of case 23 through which the rod-ends 26 project. Normally the rod-ends 26 are maintained in a position at the top of the oblong holes 34 by the means of a flat spring 35 as illustrated in Fig. 7. In each of the cylinders 29, directly beneath each of the inscribed keys of its respective row of keys, are oblong holes 36 in each side of said cylinder 29 through which project the ends of pin 37 which is fixed in rod 28 as indicated in Fig. 7, the normal position of said rod 28, owing to the spring 30, being such that the pins 37 normally engage with the right hand end of the holes 36 in the cylinder 29. Each of the inscribed keys of each row is mounted on the end of a key-rod 38 which extends downwardly through the key-board 27 and through guiding holes in a cross-bar 39. Fig. 4 clearly shows in perspective one form of construction of the key-rod 38 on which is disposed a collar 41. When disposed in the case 23 each key-rod 38 is surrounded by a spiral spring 40 which extends between the upper cross-bar 39 and the under side of collar 41. This spiral spring 40 serves normally to maintain key-rod 38 in its highest position, with the upper surface of collar 41 in contact with the under surface of key-board 27. Each of the lower ends of the key-rods 38 is square in form and projects through square guiding holes 42 in a cross-bar 43 as shown in Fig. 7, which cross-bar 43 is shown in perspective in Fig. 8. Disposed above cross-bar 43 is a movable slide-bar 44 provided with oblong rectangular holes 45 through each of which holes 45 a key-rod 38 may pass. Said slide-bar 44 is slidably mounted to move longitudinally in slotted supports 46 disposed one at each end of slide-bar 44 where such support 46 is fastened to the sides of case 23. One of said slide-bars 44 mounted in said support 46 is shown in perspective view in Fig. 9. Within the slot of the right hand support 46 is disposed a bowed spring 47 adapted normally to force the slide-bar 44 in a direction toward the left hand to a distance limited by the right hand side of the key-rods 38 when they engage with the right hand ends of the rectangular holes 45. Each of the key-rods 38 on the right hand side is provided with cam-like projections 48 which serve to force the slide-bar 44 toward the right hand overcoming the force of spring 47 in response to a depression of one of the five inscribed keys which key when depressed to its full extent makes the cam-like projection 48 on key-rod 38 pass clear through the hole 45 of the slide-bar 44 whereupon the spring 47 forces slide-bar 44 back to the left to engage with the top of the projection 48 thus holding such key in a locked depressed position until released by a depression of the blank-key at the end of its respective row, the key-rod 49 of such blank-key being also supplied by a similar cam-like projection 50 which upon being depressed forces the slide-bar 44 far enough to the right to release the key-rod 38 of the inscribed key depressed, thus when an inscribed key is depressed it is automatically locked in its depressed position but may be released upon a depression of the blank-key of the same row.

The rod-end 26 may be moved outwardly to the left through one of the oblong holes 34 to a desired predetermined distance in response to the downward movement of a rod 38 by the action of a pair of wedges 51 which are attached to the lower end of each of the key-rods 38 which pair of wedges 51 is adapted to engage with one of the pins 37 which is associated with the shaft 28 in the manner hereinbefore described. Commencing with the first inscribed key of any row of five inscribed keys, the pair of wedges 51 on the lower end of the key-rod of such inscribed key is the narrowest pair of wedges 51 of the pairs in the same row, the second pair being wider, the third pair still wider and so on successively to the right hand end of the row, the last pair being widest of all; thus, for instance referring to Fig. 7, in the bottom or lowest row of keys, key number 1 when depressed would project rod-end 26 outward a small distance, a depression of number 2 would force it out a little farther, a like depression of number 3 would project it still farther, and so on, key number 5 projecting it to its farthest point.

The cylinder 29 has no longitudinal movement and a little ways from the right hand end of each of the slots 36 on both sides of cylinder 29 is disposed a projecting pin 52 and between such pin 52 and the pin 37 a pair of wedges 51 may enter to force the pin 37 toward the left hand as before described.

Again referring to Fig. 7 the three lower rows of keys, which I have shown as assigned to the purpose of indicating the length of logs, have each of their blank-keys at the left mounted on a key-rod 49, like key-rod 49 shown in Fig. 2, and only when one of such blank-keys is depressed may an inscribed key of the same row be released after its depression. The remaining blank-keys however of the six upper rows of keys have key-rods 53 which are formed like key-rod 53 as shown in Fig. 3, wherein it is provided with a hole 54 through which a pin may pass to connect in a hinge-like manner the rod 53 with a pair of lugs 55 which project upwardly from cylinders 29 of the upper six rows of keys. Such connection between key-rod 53 and lugs 55 is shown in Fig. 7 where a portion of the side of case 23 is indicated as broken away. Thus a depression of the blank-key of either of the upper six rows of keys may serve to unlock and release an inscribed key of its own row but upon removing one's finger from such blank-key the key will immediately be forced upward by the spiral spring 40 together with its key-rod 55 and the end of its respective cylinder 29 so that its respective rod-end 26 will engage with the top of its respective hole 34.

From the description thus far given of my invention it is manifest that a depression of any one of the inscribed keys of key-board 27 as may be desired may actuate its respective rod-end 26 to project outwardly from the side of the case 23 for a distance predetermined whereby such rod-end 26 may engage with a part of a record-printing mechanism which may be disposed upon a stationary bench as indicated in Fig. 1 such engagement taking place when the travel of the carriage on which inclosing case 23 is disposed causes such rod-end 26 to pass the mechanism of inclosing case 25.

One form of construction of the essential features of the record-printing mechanism disposed in inclosing case 25 is shown in Figs. 11, 12, 13, 14, 15 and 16. Referring to Fig. 13 there is diagrammatically shown one form of the essential parts of the printing mechanism that may be actuated in response to the varying position of one of the rod-ends 26 which varying position may be determined by the several keys of a row on key-board 27. A ribbon of paper 56 leading from a roll of paper 57 passes around the right hand side of a roller 58 shown in end elevation, thence may lead to suitable mechanism not shown whereby such paper ribbon 56 may be caused to move on and past the roller 58 at a known constant rate of speed, or have stamped upon it automatically by a time clock the time of each operation. The width of the paper ribbon 56 and the length of the roller 58 may be such as will permit nine type supporting devices 59 to be disposed in a row side by side so that the middle type of the five types contained in each of the type-holders 60 is in line with and of the same elevation as the axis of the roller 58 whereby in operation nine columns of characters might be printed side by side on the paper ribbon 56 as it passes over the roller 58 in the manner indicated in Fig. 13.

The type holder 60 is shown more clearly in Fig. 15 and consists in a box-like structure having five longitudinal slots 61 through each of its two largest sides and having longitudinal grooves 62 disposed in its walls within whereby five types may be disposed to move back and forth freely such movement being limited by pin 63 (projecting from each side of each type) which engages with the ends of the slot 61. I have shown in Fig. 15 one type 64 as projecting from the type-holder 60 such type 64 is shown as blank but might be adapted to print any desired character. The position in which type 64 is shown indicates the position a type would have when printing on the paper ribbon 56. Each of the five types of each of the type-holders 60 is articulated with a type-rod 63 as shown in Fig. 14 whereby a longitudinal movement may be communicated to a type to impel it against the paper ribbon 56. At the top and bottom of each of the largest side of the type holder 60 is a guiding lug 66 adapted to fit and engage with a guiding groove 67 disposed within the sides of each of the type supporting cases 59 wherein one of the type holders 60 is disposed and adapted to move upward or downward in response to the cam-like action of pins 63 when engaging with the curved edges 68 of the depression in the sides of the type-supporting case 59 one of which sides 69 is shown in perspective view in Fig. 16. The type-holders 60 normally are disposed so that the middle type of a type-holder 60 is equi-distant from the top and bottom of the supporting case 59 and such normal position is maintained by the spiral springs 70 as indicated in diagram of Fig. 13 and thus when a character on such a middle type is to be printed no vertical movement of the type-holder 60 takes place, but if type to be impressed upon the paper ribbon 56 be, say, the top type in the type-holder 60 then the action of the pins 63 of such type in engagement with the curved edge 68 (indicated by broken line in Fig. 13) will cause the type-holder 60 to be forced downward against the lower spring 70 till such top type is opposite the proper point of the paper 56 on the roller 58 for printing, and in like manner any other one of the types of a type-holder 60 is guided to the proper point of printing by the action of its pins 63 guided by the curved edge 68. The five type-rods 65 are articulated at the ends distant from the type, each with one of a row of five arms 71 which arm 71 by its swinging movement may communicate motion to a type to print as indicated in Fig. 13 where the middle arm 71 is shown as having forced the middle type against paper 56. The arms 71 are each fixed upon a shaft 72 which projects through and is supported by the walls of a hole in a crank-board 73 a fragment of which board 73 with arm 71 and shaft 72 are shown in Fig. 12. A spiral spring 74 is connected with a cross-arm 75 which is fixed on said shaft 72 whereby its retractile force may act on arm 71 and type-bar 65 to withdraw a type after it has finished an operation of printing and bring the arm 71 and cross-arm 75 back to their normal vertical position. The shafts 72 of each row of five arms 71 project through the crank-board 73 where they are each bent at a right angle to form a crank 76 whereby movement of said crank 76 may actuate a shaft 72 to communicate motion to a type-bar 65.

Fig. 11 shows in perspective the form of the crank-board 73 and the relative dispositions thereon of the nine rows of cranks 76 each of which rows includes five cranks 76 and each of which rows corresponds with a set of five type-bars 65 and a type-holder 60 with its five type and also with a row of five inscribed keys of the key-board 27. In Fig. 11 I have indicated the thin edge of the crank-board 73 with the number 77 to correspond with the edge 77 of the same crank-board 73 as shown in Fig. 1 whereby the position of said crank-board 73 may be clearly shown in Fig. 1, and whereby may be seen how each of the rod-ends 26 may engage with any one of its respective row of cranks 76 when the mill carriage carries the case 23 past the stationary case 25. In Fig. 11 it will be seen that the board 73, at the point where the crank-shaft 72 of the crank 76ª projects through, is thinner than at the point where the shaft of the crank 76ᵇ passes through while at the point where crank 76ᶜ is located the board 73 is still thicker and so on, the point of location of crank 76ᵉ being thickest and hence a rod-end 26 will have to project outwardly from case 23 to its farthest extent to engage with the crank 76ª to swing said crank 76ª while said rod-end 26 would move outwardly to its smallest extent to engage with crank 76ᵉ and to operate the cranks, 76ᵇ—76ᶜ and 76ᵈ, respectively, the rod-end 26 obviously would move outwardly to different respective distances accordingly. Manifestly the engagement of a rod-end 26 with a crank 76 on the stationary board 73 would take place while the carriage moves relatively in the direction of the arrow shown in Fig. 11 and after engaging with and swinging a crank 76 to actuate the type said rod-end 26 in its travel immediately hits the diagonal face of a ledge 78 formed by the increased thickness of the board 73 which ledge 78 acting in a cam-like manner swerves the rod-end 26 from its course, and depressing the cylinder 29, it enters one of the grooves 79 or if it be a rod-end 26 which is adapted to engage with the lowest row of cranks 76ª—76ᵇ—76ᶜ—76ᵈ and 76ᵉ it is forced downward to slide along the surface of the lower edge of the board 73 and thus avoid engaging with any other of the cranks 76 in its respective row.

In Fig. 6 is shown a device that may be substituted for the spring 35 which spring 35 is associated with each of the lowest three cylinders 29. Such device consists in fastening to the lower end of each of the three lowest key-rods 49 of the left hand blank keys a hook-shaped extension 80 which is adapted to lift the cylinder 29 when a key-rod 49 is raised by force of its spiral spring 40 in an obvious manner.

While I have shown my invention as embodying means for printing on paper ribbon nine rows of five different kinds of characters it is manifest that the key-board 73 may have any desired practical number of keys greater or less than I have shown together with corresponding apparatus for printing a record; moreover it is obvious that many different forms of the various parts of my invention may be employed without departing from the spirit of my invention or giving it a different mode of operation.

What I claim is:

1. The combination with a movable portion of a machine, of a recorder-actuating device mounted on said movable portion of said machine and provided with movable parts that are adapted to be set in a desired predetermined position, a key-board, each key of which is adapted by intervening mechanism to control the position of one of said movable parts of said recorder-actuating device, and a recorder device fixed in a position in proximity to the path of said recorder-actuating device so that operative members of its recording mechanism may engage with said movable parts of said recorder-actuating device when said recorder-actuating device is caused to pass said recording device.

2. In an apparatus for recording data relating to the operations of machinery, the combination with a recording mechanism, of a key-board comprising a plurality of series of actuating keys, a key-rod associated with each of said keys, and a shaft associated with each of said series of said keys, said shaft being slidably mounted in a movable support and adapted to be moved endwise within said movable support for a given different distance with respect to the action of each of the different keys of the series of keys with which it is associated whereby each key of said series of keys may cause an end of said shaft exclusively to engage with a particular member of said recording mechanism.

3. In an apparatus for recording data relating to the operation of machinery, the combination with a movable part of a machine, of a time recording and printing mechanism embodied in one structure which is disposed in a fixed position adjacent to said movable part of said machine, and a plurality of key-actuated mechanisms embodied in another structure which is disposed upon and attached to said movable part of said machine said key-actuated mechanisms being each disposed and adapted to engage with a part of said time recording and printing mechanism at times as required to operate said recording and printing mechanism.

4. In an apparatus for recording data relating to the operation of machinery, the combination with a movable part of a machine, of a record-printing mechanism embodied in a structure which is disposed in a fixed position adjacent to said movable part and a transmitting device embodied in a structure which is mounted upon and attached to said movable part said transmitting device comprising a plurality of shafts each of which is adapted to be moved endwise for a required distance to engage with a particular actuating part of said record-printing mechanism whereby a particular character may be printed.

5. In an apparatus for recording data relating to the operation of machinery, a transmitting device comprising a plurality of series of keys, a key-rod associated with each of said keys and adapted to be locked in a desired abnormal position, means for unlocking said key-rod to permit it to return to its normal position and a plurality of movable shafts each of which is associated with one of said series of keys and adapted to be moved endwise by each key of the series of keys associated with it, in combination with a recording mechanism disposed with respect to said transmitting device so that its operation may be controlled in response to variations in the lengthwise positions of said shafts which shafts are adapted to engage with operative parts of said recording mechanism.

In witness whereof, I hereunto subscribe my name this ninth day of December A. D., 1911.

JOHN G. McINTOSH.

Witnesses:
R. C. SMITH,
W. W. WILKINSON.